United States Patent [19]

Kawasumi et al.

[11] Patent Number: 5,522,920

[45] Date of Patent: Jun. 4, 1996

[54] AQUEOUS INK COMPOSITION FOR BALL-POINT PEN

[75] Inventors: Toshimitsu Kawasumi; Satoshi Maruyama; Yoshiko Yamaoka, all of Osaka, Japan

[73] Assignee: Sakura Color Products Corporation, Osaka, Japan

[21] Appl. No.: 408,595

[22] Filed: Mar. 22, 1995

[30] Foreign Application Priority Data

Mar. 31, 1994 [JP] Japan .................... 6-088092

[51] Int. Cl.$^6$ ........................... C09D 11/18
[52] U.S. Cl. ..................... 106/20 R; 106/22 R
[58] Field of Search ............ 106/20 R, 22 R, 106/23 R, 503

[56] References Cited

U.S. PATENT DOCUMENTS

| | | | |
|---|---|---|---|
| 4,350,531 | 9/1982 | Distler et al. ............ | 106/20 R |
| 4,698,099 | 10/1987 | Nakamura et al. ............ | 106/503 |
| 4,704,165 | 11/1987 | Nakamura et al. ............ | 106/503 |
| 4,762,568 | 8/1988 | Nakamura et al. ............ | 106/503 |
| 4,872,916 | 10/1989 | Latosky ............ | 106/503 |
| 5,011,533 | 4/1991 | Kuwajima et al. ............ | 106/503 |
| 5,164,232 | 11/1992 | Henseleit et al. ............ | 106/22 R |
| 5,215,579 | 6/1993 | Keemer et al. ............ | 106/503 |
| 5,324,354 | 6/1994 | Jesse et al. ............ | 106/22 R |
| 5,431,720 | 7/1995 | Nagai et al. ............ | 106/20 R |
| 5,470,385 | 11/1995 | Keemer et al. ............ | 106/503 |

Primary Examiner—Helene Klemanski
Attorney, Agent, or Firm—Armstrong, Westerman, Hattori, McLeland & Naughton

[57] ABSTRACT

An aqueous ink composition for ball-point pen is provided which includes an aqueous ink mixture containing at least a coloring agent, a dispersant, a water-soluble organic solvent and water, and a compound of the general formula (1):

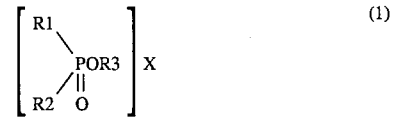

wherein R1 and R2 represent OH and/or HO(CH$_2$CH$_2$O)n and/or

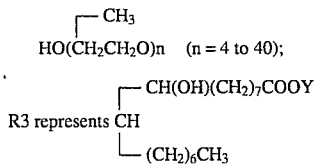

where Y is CmH2m+1 (m is an integer of not larger than 4); and X represents an alkali metal salt, amine salt or alkanolamine salt. The aqueous ink composition is excellent in lubricity, wear resistance of ball seat, writing touch and long-term stability, and is less liable to feather on paper.

8 Claims, No Drawings

AQUEOUS INK COMPOSITION FOR BALL-POINT PEN

BACKGROUND OF THE INVENTION

1. Field of the Invention

The present invention relates to aqueous ink compositions for ball-point pen and, more particularly, to such aqueous ink compositions which are superior in lubricity and hence are free of clogging at the tip of ball-point pen even after prolonged use.

2. Related Art

It has been a conventional practice to prepare an aqueous ink composition for ball-point pen by adding a water-soluble organic solvent of a polyvalent alcohol or a derivative thereof to an aqueous solution containing a water-soluble dye, water-dispersible pigment or colored resin emulsion. Attempts have been made to enhance the lubricity of the aqueous ink composition by blending the ink composition with such lubricants as an alkali metal salt of an unsaturated fatty acid, or an alkali metal salt or amine salt of an anionic surface active agent having a carboxyl group. Refer to Japanese Unexamined Patent Publications No.61-16974 (1986), No.61-174278 (1986) and No.4-164977 (1992) and Japanese Examined Patent Publication No.5-54875.

With any of the foregoing conventional lubricants, however, the resultant ink has a difficulty in simultaneously satisfying requirements for lubricity and for other writing characteristics. For instance, an ink with satisfactory lubricity often exhibits extremely decreased surface tension, which may result in practical problems such that the ink is liable to blur on paper. Further, many ink compositions show unsatisfactory lubricity due to influences of selected pigment or resin, even if lubricants are added thereto.

It is, therefore, an object of the present invention to provide an aqueous ink composition for ball-point pen which overcomes the foregoing drawbacks of the conventional ink compositions, assures long-term stability, and is less liable to blur on paper.

As a result of intensive study to solve the foregoing problems, it has been found that the problems associated with the conventional ink compositions can be solved by adding a specific compound to an aqueous ink composition for ball-point pen comprising at least an aqueous solvent composed of a water-soluble organic solvent and water, a surface active agent or water-soluble resin as a dispersant, and a coloring agent.

SUMMARY OF THE INVENTION

In accordance with the present invention, there is provided an aqueous ink composition for ball-point pen comprising an aqueous ink mixture containing at least a coloring agent, a dispersant, a water-soluble organic solvent and water, and a compound of the general formula (1):

$$\left[ \begin{array}{c} R1 \\ \phantom{R1}\diagdown \\ \phantom{R1}\phantom{\diagdown}POR3 \\ \phantom{R1}\diagup\,\|\, \\ R2\phantom{\diagup}O \end{array} \right] X \tag{1}$$

wherein R1 and R2 represent OH and/or $HO(CH_2CH_2O)_n$ and/or

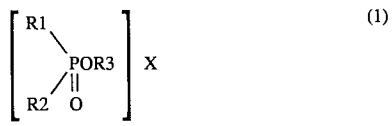

R3 represents $CH \begin{cases} CH(OH)(CH_2)_7COOY \\ (CH_2)_6CH_3 \end{cases}$ where Y is $C_mH_{2m+1}$ (m is an integer of not larger than 4); and X represents an alkali metal salt, amine salt or alkanolamine salt.

In particular, the content of the compound of the formula (1) is preferably 0.05 to 10 % by weight relative to the total amount of the ink.

Further, the coloring agent comprising a pigment or a colored resin emulsion can improve the property of the compound of the formula (1).

Other objects and advantages of the present invention will be readily apparent from the following detailed description.

DESCRIPTION OF THE PREFERRED EMBODIMENTS

In the present invention, the compound of the formula (1) is readily soluble in the ink composition. Exemplary compounds thereof include a triethanolamine salt of an adduct of a monoalkyl phosphate with ethylene oxide and a potassium salt of an adduct of a monoalkyl phosphate with propylene oxide.

Preferred compound of the formula (1) include those represented by the following specific formulae (1) to (5):

Specific formula (1):

$$R1, R2 = (CH_2CH_2O)_{23}OH$$

$$R3 = CH \begin{cases} CH(OH)(CH_2)_7COOCH_3 \\ (CH_2)_6CH_3 \end{cases}$$

$$X = N(CH_2CH_2OH)_3$$

Specific formula (2):

$$R1, R2 = (CHCH_2O)_{17}OH \begin{cases} CH_3 \end{cases}$$

$$R3 = CH \begin{cases} CH(OH)(CH_2)_7COOCH_3 \\ (CH_2)_6CH_3 \end{cases}$$

$$X = Na$$

Specific formula (3):

$$R1, R2 = OH$$

$$R3 = CH \begin{cases} CH(OH)(CH_2)_7COOCH_3 \\ (CH_2)_6CH_3 \end{cases}$$

$$X = N(CH_2CH_2OH)_3$$

Specific formula (4):

$$R1, R2 = (CH_2CH_2OH)_{23}OH$$

$$R3 = CH \begin{cases} CH(OH)(CH_2)_7COOCH_3 \\ (CH_2)_6CH_3 \end{cases}$$

$$X = K$$

Specific formula (5):

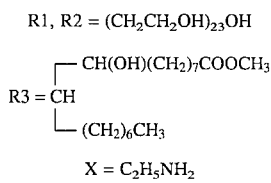

These compounds, unlike conventional alkaline-fatty-acid-based lubricants, have a polyoxethylene chain or polyoxypropylene chain and are hence readily soluble in water. Furthermore, they are stable in a broad pH range and exhibit corrosion-preventive effect for copper. Therefore, they are best suited for aqueous ball-point pens. The content of the compound to be used is 0.05% by weight to 10% by weight, preferably 0.5% by weight to 5% by weight relative to the total amount of the aqueous ink composition. If the content thereof is less than 0.05% by weight, the resultant ink composition shows unsatisfactory lubricity. If the content exceeds 10% by weight, the resultant ink composition causes blurring, or has an increased viscosity, thereby deteriorating writing smoothness.

The compounds specified by the aforesaid specific formulae (1) to (5) may be used either alone or in combination.

The pigment for use in the aqueous ink composition of the present invention may be any of various kinds of known pigments. Examples of specific pigments include organic pigments such as azo-type pigments, condensation polyazo-type pigments, phthalocyanine-type pigments, quinacridone-type pigments, anthraquinone-type pigments, dioxazine-type pigments, indigo-type pigments, thioindigo-type pigments, perinone, perylene-type pigments and melamine-type pigments; inorganic pigments such as titanium oxides, iron oxides and carbon black; and colored resin emulsions such as prepared by coloring an aqueous dispersion of fine polymer particles of an average particle diameter of 0.1 to 1 um obtained by emulsion polymerization of one or more resins selected from styrene resins, acrylic resins and acrylonitrile resins with a basic dye or fluorescent basic dye and/or a fluorescent brightener. These may be used either alone or as mixtures.

The content of the pigment to be used is usually 1% by weight to 30% by weight, preferably 3% by weight to 15% by weight relative to the total amount of the ink composition. If the content thereof is less than 1% by weight, the ink density on paper is undesirably reduced. On the other hand, if the content exceeds 30 % by weight, the resultant ink composition has an increased viscosity and hence deteriorates writing smoothness. When the colored resin emulsion is used, the content thereof is within the range of 10% by weight to 50% by weight relative to the total amount of the ink composition. If the content is less than 10% by weight, the ink density on paper is undesirably reduced. On the other hand, if the content exceeds 50% by weight, the resultant ink composition has an increased viscosity and hence deteriorates writing smoothness.

The pigment dispersant comprises at least one selected from generally used water-soluble resins, surface active agents and the like. Although the water-soluble resins may be natural ones, semisynthetic ones or synthetic ones, water-soluble synthetic resins are the most preferable in terms of fungi- and rot-resistance and viscosity characteristics of ink for writing instruments. Examples of such synthetic resins include water-soluble acrylic resins, water-soluble maleic resins, water-soluble styrene resins, water-soluble styrene-acrylic resins, water-soluble styrene-maleic resins, polyvinyl pyrrolidone, polyvinyl alcohol and water-soluble urethane resins. The surface active agent for use in the present invention is any one selected from anionic surface active agents, cationic surface active agents, nonionic surface active agents and ampholytic surface active agents. The amount of such a dispersant to be used is 0.05 parts by weight to 2 parts by weight relative to 1 part by weight of the pigment. If the amount is less than 0.05 parts by weight, the dispersion stability of the pigment is degraded. On the other hand, if the amount exceeds 2 parts by weight, the resultant ink composition has an increased viscosity and hence deteriorates writing smoothness.

Examples of water-soluble organic solvents include polyvalent alcohols such as ethylene glycol, diethylene glycol, propylene glycol and glycerin; glycol ethers such as propylene glycol monomethyl ether; and glycol ether esters such as propylene glycol monomethyl ether acetate. These may be used either alone or as mixtures. The content of such water-soluble organic solvent is preferably within the range of 1% by weight to 40% by weight relative to the total amount of the ink composition. If the content is less than 1% by weight, the resultant ink dries too fast at a pen tip. On the other hand, if the content exceeds 40% by weight, the resultant ink dries too slow on paper.

As required, the ink Composition may contain appropriate pH adjustor, pseudo plasticity fomation agent, rust-preventive agent, antiseptic agent, antifungal agent and the like. Examples of specific pH adjustors for use in the present invention include caustic soda, sodium carbonate, alkanolamine and ammonia. Usable as the pseudo plasticity fomation agent are natural polysaccharides and semisynthetic cellulosic polymers selected from generally-used water-soluble polymers. More specifically, exemplary natural polysaccharides include guar gum, locust bean gum, weran gum, rhamzan gum, xanthan gum and the like, which have polymeric structure such as obtained by polymerization of monosaccharides such as glucose, galactose, rhamnose, mannose and a glucuronic acid salt. The semisynthetic cellulosic polymers include methyl cellulose, ethyl cellulose and carboxymethyl cellulose which are rendered water-soluble by esterifying or etherifying the hydroxyl group of cellulose. Examples of specific corrosion-preventive agents usable in the present invention include benzotriazole, derivatives thereof and dicyclohexylammonium nitrate. Examples of specific antiseptic agents are potassium sorbate, sodium benzoate, pentachlorophenyl sodium, sodium dihydroacetate and 1,2-benzisothiazoline-3-on.

The ink composition for ball-point pen of the present invention preferably has an ink viscosity ranging from 500 cps to 10000 cps in terms of dispersibility of ink and writing characteristics. If the ink viscosity is less than 500 cps, the resultant ink composition exhibits a poor dispersion stability, and when applied to a ball-point pen of direct ink supply type, the ink composition may inconveniently drip from the pen tip. If the ink viscosity exceeds 10000 cps, the resultant ink is not smoothly supplied to a pen tip of a ball-point pen to follow up the movement of the pen, thus deteriorating writing smoothness.

Although the action of the compound represented by the general formula (1) according to the present invention has not been fully determined yet, it is supposed that the compound assists in forming a thin layer between a ball-receiving seat of metal tip and a ball, thereby enhancing the lubricity of the ink. Further, the compound does not lower the surface tension of the ink composition too much and, hence, the ink composition is less liable to blur on paper. Furthermore, the ink composition is highly stable for a long time by virtue of its corrosion-proofing effect for copper, satisfactory stability in a broad pH range, and good thermal stability.

EXAMPLES

The present invention will be more fully described by way of examples thereof. It should be noted that these examples are not limitative of the invention.

In Examples 1 to 4 and Comparative Examples 1 to 4, ink compositions according to the present invention and reference ink compositions were applied to ball-point pens of the wick type. These ball-point pens each comprised an ink occluder formed of a bundle of fibers with its periphery covered with a film or a resin and impregnated with a low-viscosity ink, a relay lead in communication with the ink occluder, and a pen tip made of German silver or stainless steel.

In Examples 5 to 8 and Comparative Examples 5 to 8, ink compositions according to the present invention and reference ink compositions were applied to ball-point pens of the ink-container tube type. These ball-point pens each comprised an ink tank having an ink container tube made of polypropylene or the like which was adapted to be directly charged with a high-viscosity ink (the same type as the oil ink type ball-point pen) and the tail end of which was clogged with a back-flow preventing material, and a pen tip communicating with the ink tank and fitted around a writing tip made of German silver or stainless steel.

Example 1

| | |
|---|---|
| Copper phthalocyanine blue | 10.0 parts |
| Sodium salt of styrene-acrylic acid copolymer (dispersant) | 3.0 parts |
| Glycerin | 5.0 parts |
| Propylene glycol | 20.0 parts |
| Compound of general formula (1) specified by specific formula (1) | 0.5 parts |
| 1,2-benzisothiazoline-3-on (antiseptic agent) | 1.5 parts |
| Benzotriazole (corrosion-preventive agent) | 0.5 parts |
| Water | 59.5 parts |

Copper phthalocyanine blue, sodium salt of styrene-acrylic acid copolymer and water were first mixed together for dispersion for one hour by means of a sand mill. The remaining ingredients were then added to the resultant dispersion and dissolved therein by stirring. A blue ink was obtained after the resultant mixture was filtered.

Example 2

| | |
|---|---|
| Copper phthalocyanine green | 8.0 parts |
| Sodium salt of styrene-maleic acid copolymer (dispersant) | 2.0 parts |
| Glycerin | 10.0 parts |
| Propylene glycol | 15.0 parts |
| Compound of general formula (1) specified by specific formula (2) | 10.0 parts |
| Sodium benzoate | 0.2 parts |
| Benzotriazole (corrosion-preventive agent) | 0.5 parts |
| Water | 54.3 parts |

Copper phthalocyanine green, sodium salt of styrene-maleic acid copolymer and water were first mixed together for dispersion for one hour by means of a sand mill. The remaining ingredients were then added to the resultant dispersion and dissolved therein by stirring. A green ink was obtained after the resultant mixture was filtered.

Example 3

| | |
|---|---|
| Carbon black | 5.0 parts |
| Sodium salt of styrene-acrylic acid copolymer (dispersant) | 1.0 part |
| Glycerin | 5.0 parts |
| Propylene glycol | 20.0 parts |
| Compound of general formula (1) specified by specific formula (3) | 3.5 parts |
| 1,2-benzisothiazoline-3-on (antiseptic agent) | 2.0 parts |
| Benzotriazole (corrosion-preventive agent) | 0.5 parts |
| Water | 63.0 parts |

Carbon black, sodium salt of styrene-acrylic acid copolymer and water were first mixed together for dispersion for one hour by means of a sand mill. The remaining ingredients were then added to the resultant dispersion and dissolved therein by stirring. A black ink was obtained after the resultant mixture was filtered.

Example 4

| | |
|---|---|
| Quinacridone red | 8.0 parts |
| Sodium salt of styrene-maleic acid copolymer (dispersant) | 2.0 parts |
| Glycerin | 5.0 parts |
| Propylene glycol | 15.0 parts |
| Compound of general formula (1) specified by specific formula (1) | 5.0 parts |
| Sodium benzoate (antiseptic agent) | 1.0 part |
| Benzotriazole (corrosion-preventive agent) | 0.5 parts |
| Water | 63.5 parts |

Quinacridone red, sodium salt of styrene-maleic acid copolymer and water were first mixed together for dispersion for one hour by means of a sand mill. The remaining ingredients were then added to the resultant dispersion and dissolved therein by stirring. A pink ink was obtained after the resulting mixture was filtered.

Example 5

| | |
|---|---|
| Copper phthalocyanine blue | 10.0 parts |
| Sodium salt of styrene-acrylic acid copolymer (dispersant) | 3.0 parts |
| Glycerin | 5.0 parts |
| Propylene glycol | 10.0 parts |
| Compound of general formula (1) specified by specific formula (1) | 0.05 parts |
| 1,2-benzisothiazoline-3-on (antiseptic agent) | 1.0 parts |
| Benzotriazole (corrosion-preventive agent) | 0.5 parts |
| Water | 70.45 parts |

Copper phthalocyanine blue, sodium salt of styrene-acrylic acid copolymer and water were first mixed together for dispersion for one hour with a sand mill. The remaining ingredients were then added to the resultant dispersion and dissolved therein by stirring. A blue ink was obtained after the resultant mixture was filtered.

Example 6

| | |
|---|---|
| Quinacridone red | 10.0 parts |
| Sodium salt of styrene-maleic acid copolymer (dispersant) | 2.0 parts |
| Glycerin | 10.0 parts |
| Propylene glycol | 15.0 parts |
| Compound of general formula (1) specified by | 5.0 parts |

| | |
|---|---|
| specific formula (5) | |
| 1,2-benzisothiazoline-3-on (antiseptic agent) | 1.0 part |
| Benzotriazole (corrosion-preventive agent) | 0.5 parts |
| Water | 63.5 parts |

Quinacridone red, sodium salt of styrene-maleic acid copolymer and water were first mixed together for dispersion for one hour by means of a sand mill. The remaining ingredients were then added to the resultant dispersion and dissolved therein by stirring. A pink ink was obtained after the resultant mixture was filtered.

Example 7

| | |
|---|---|
| Copper phthalocyanine blue | 4.0 parts |
| Sodium salt of styrene-acrylic acid copolymer (dispersant) | 1.0 parts |
| Propylene glycol | 10.0 parts |
| Glycerin | 5.0 parts |
| Compound of general formula (1) specified by specific formula (1) | 1.5 parts |
| 1,2-benzisothiazoline-3-on (antiseptic agent) | 0.5 parts |
| Benzotriazole (corrosion-preventive agent) | 0.5 parts |
| Xanthan gum (pseudo plasticity fomation agent) | 0.4 parts |
| Water | 77.1 parts |

Xanthan gum was added little by little to 30 parts of water to avoid formation of undissolved lump of xanthan gum and completely dissolved therein by stirring. To the resultant solution were added copper phthalocyanine blue, sodium salt of styrene-acrylic acid copolymer and 47.1 parts of water, and the resultant mixture was stirred for dispersion for one hour by means of a sand mill. The remaining ingredients were then added to the resultant dispersion and dissolved therein by stirring for one hour. A blue ink was obtained after the resultant mixture was filtered.

Example 8

| | |
|---|---|
| Copper phthalocyanine green | 4.0 parts |
| Sodium salt of styrene-acrylic acid copolymer (dispersant) | 1.5 parts |
| Propylene glycol | 10.0 parts |
| Glycerin | 5.0 parts |
| Compound of general formula (1) specified by specific formula (2) | 5.0 parts |
| Sodium benzoate (antiseptic agent) | 1.0 part |
| Benzotriazole (corrosion-preventive agent) | 0.5 parts |
| Weran gum (psudo plasticity fomation agent) | 0.3 parts |
| Water | 72.7 parts |

Weran gum was added little by little to 30 parts of water to avoid formation of undissolved lump of weran gum and completely dissolved therein by stirring. To the resultant solution were added copper phthalocyanine green, sodium salt of styrene-acrylic acid copolymer and 42.7 parts of water, and the resultant mixture was stirred for dispersion for one hour by means of a sand mill. The remaining ingredients were then added to the resultant dispersion and dissolved therein by stirring for one hour. A green ink was obtained after the resultant mixture was filtered.

Example 9

| | |
|---|---|
| LUMICOL NKW-2105 | 40.0 parts |
| (dye: C. I. Basic Yellow 40) | |
| Glycerin | 5.0 parts |
| Propylene glycol | 10.0 parts |
| Compound of general formula (1) specified by specific formula (1) | 0.5 parts |
| Sodium benzoate (antiseptic agent) | 1.0 part |
| Benzotriazole (corrosion-preventive agent) | 0.5 parts |
| Xanthan gum (pseudo plasticity foreation agent) | 0.3 parts |
| Water | 42.7 parts |

Xanthan gum was added little by little to 30 parts of water to avoid formation of undissolved lump of xanthan gum and completely dissolved therein by stirring. The remaining ingredients were added to the resultant solution and dissolved therein by stirring for one hour. A fluorescent yellow ink was obtained after the resultant mixture was filtered.

Example 10

| | |
|---|---|
| Carbon black | 4.0 parts |
| Sodium salt of styrene-acrylic acid copolymer (dispersant) | 1.0 part |
| Propylene glycol | 10.0 parts |
| Glycerin | 5.0 parts |
| Compound of general formula (1) specified by specific formula (2) | 2.0 parts |
|  | 2.0 parts |
| Sodium benzoate (antiseptic agent) | 1.0 part |
| Benzotriazole (corrosion-preventive agent) | 0.5 parts |
| Xanthan gum (pseudo plasticity fomation agent) | 0.3 parts |
| Water | 76.2 parts |

Xanthan gum was added little by little to 30 parts of water to avoid formation of undissolved lump of xanthan gum and completely dissolved therein by stirring. To the resultant solution were added carbon black, sodium salt of styrene-acrylic acid copolymer and 46.2 parts of water, and the resultant mixture was stirred for dispersion for one hour by means of a sand mill. The remaining ingredients were then added to the resultant dispersion and dissolved therein by stirring for one hour. A black ink was obtained after the resultant mixture was filtered.

Example 11

| | |
|---|---|
| Copper phthalocyanine blue | 4.0 parts |
| Sodium salt of styrene-acrylic acid copolymer (dispersant) | 1.0 part |
| Propylene glycol | 5.0 parts |
| Glycerin | 5.0 parts |
| Compound of general formula (1) specified by specific formula (2) | 0.1 parts |
| 1,2-benzisothiazoline-3-on (antiseptic agent) | 0.5 parts |
| Benzotriazole (corrosion-preventive agent) | 0.5 parts |
| Xanthan gum (pseudo plastisity fomation agent) | 0.3 parts |
| Water | 83.6 parts |

Xanthan gum was added little by little to 30 parts of water to avoid formation of undissolved lump of xanthan gum and completely dissolved therein by stirring. To the resultant solution were added copper phthalocyanine blue, sodium salt of styrene-acrylic acid copolymer and 53.6 parts of water, and the resultant mixture was stirred for dispersion for one hour by means of a sand mill. The remaining ingredients were then added to the resultant dispersion and dissolved therein by stirring for one hour. A blue ink was obtained after the resultant mixture was filtered.

Example 12

| | |
|---|---|
| Copper phthalocyanine green | 4.0 parts |
| Sodium salt of styrene-acrylic acid copolymer (dispersant) | 1.0 part |
| Propylene glycol | 5.0 parts |
| Glycerin | 5.0 parts |
| Compound of general formula (1) specified by specific formula (5) | 6.0 parts |
| 1,2-benzisothiazoline-3-on (antiseptic agent) | 0.5 parts |
| Benzotriazole (corrosion-preventive agent) | 0.5 parts |
| Xanthan gum (pseudo plasticity formation agent) | 0.3 parts |
| Water | 77.7 parts |

Xanthan gum was added little by little to 30 parts of water to avoid formation of undissolved lump of xanthan gum and completely dissolved therein by stirring. To the resultant solution were added copper phthalocyanine green, sodium salt of styrene-acrylic acid copolymer and 47.7 parts of water, and the resultant mixture was stirred for dispersion for one hour by means of a sand mill. The remaining ingredients were then added to the resultant dispersion and dissolved therein by stirring for one hour. A green ink was obtained after the resultant mixture was filtered.

Comparative Example 1

A blue ink was prepared in substantially the same manner as described in Example 1 except that the compound of general formula (1) specified by specific formula (1) was replaced with the same amount of a fluorine-based surface active agent.

Comparative Example 2

A green ink was prepared in substantially the same manner as described in Example 2 except that the compound of general formula (1) specified by specific formula (2) was replaced with the same amount of a fluorine-based surface active agent.

Comparative Example 3

A black ink was prepared in substantially the same manner as described in Example 3 except that the compound of general formula (1) specified by specific formula (3) was replaced with the same amount of a fluorine-based surface active agent.

Comparative Example 4

A pink ink was prepared in substantially the same manner as described in Example 4 except that the compound of general formula (1) specified by specific formula (1) was replaced with the same amount of a fluorine-based surface active agent.

Comparative Example 5

A blue ink was prepared in substantially the same manner as described in Example 5 except that the compound of general formula (1) specified by specific formula (1) was replaced with the same amount of a fluorine-based surface active agent.

Comparative Example 6

A pink ink was prepared in substantially the same manner as described in Example 6 except that the compound of general formula (1) specified by specific formula (5) was replaced with the same amount of a fluorine-based surface active agent.

Comparative Example 7

A blue ink was prepared in substantially the same manner as described in Example 7 except that the compound of general formula (1) specified by specific formula (4) was replaced with the same amount of a fluorine-based surface active agent.

Comparative Example 8

A green ink was prepared in substantially the same manner as described in Example 8 except that the compound of general formula (1) specified by specific formula (2) was replaced with the same amount of a fluorine-based surface active agent.

Comparative Example 9

A fluorescent yellow ink was prepared in substantially the same manner as described in Example 9 except that the compound of general formula (1) specified by specific formula (1) was replaced with the same amount of a fluorine-based surface active agent.

Comparative Example 10

A black ink was prepared in substantially the same manner as described in Example 10 except that the compound of general formula (1) specified by specific formula (2) was replaced with the same amount of a fluorine-based surface active agent.

Comparative Example 11

A blue ink was prepared in substantially the same manner as described in Example 11 except that the compound of general formula (1) specified by specific formula (1) was replaced with the same amount of a fluorine-based surface active agent.

Comparative Example 12

A green ink was prepared in substantially the same manner as described in Example 12 except that the compound of general formula (1) specified by specific formula (5) was replaced with the same amount of a fluorine-based surface active agent.

Writing characteristics tests were carried out using writing instruments (or ball-point pens) respectively charged with the aqueous ink compositions prepared in Examples 1 to 12 and Comparative Examples 1 to 12.

The aqueous ink compositions prepared in Examples 1, 2, 5 and 6 and Comparative Examples 1, 2, 5 and 6 were each impregnated in an ink occluder, which was housed in an aqueous ink ball-point pen comprising a relay lead, an ultra-hard ball having a diameter of 0.6 mm and a writing tip made of German silver.

The aqueous ink compositions prepared in Examples 3 and 4 and Comparative Examples 3 and 4 were each impregnated in an ink occluder, which was housed in an aqueous ink ball-point pen comprising a relay lead, an ultra-hard ball having a diameter of 0.5 mm and a writing tip made of stainless steel.

The aqueous ink compositions prepared in Examples 7, 8, 11 and 12 and Comparative Examples 7, 8, 11 and 12 (high-viscosity inks) were each filled in polypropylene ink container tube of the same type as that of an oil ink ball-point pen, which was clogged with a back-flow preventing material at the tail end thereof to be formed into an ink tank. To prepare a refill, a pen tip fitted around a writing tip made of German silver was attached to the ink tank. Then, the thus prepared refills respectively containing these aqueous ink compositions were centrifuged for deaeration.

The aqueous ink compositions prepared in Examples 9 and 10 and Comparative Examples 9 and 10 (high-viscosity inks) were each filled in polypropylene ink container tube of the same type as that of an oil ink ball-point pen, which was clogged with a back-flow preventing material at the tail end thereof to be formed into an ink tank. To prepare a refill, a pen tip fitted around a writing tip made of German silver was attached to the ink tank. Then, the thus prepared refills respectively containing these aqueous ink compositions were centrifuged for deaeration.

First, using a spiral-type writing tester, a line of 500 m was drawn on a JIS P3201 paper sheet A with each of the ball-point pens thus prepared, under the following writing conditions: writing angle=65, load=100 g and writing speed=7 cm/sec. Thereafter, the writing touch of each of the ball-point pens was examined by handwriting. Further, the writing tip of each of the ball-point pens was cleaned and then measured for an amount of ball sinkage by means of a tool microscope. Another sample group of the ball-point pens was allowed to stand for one month within a thermostatic chamber at a temperature of 50° C. with the writing tips thereof being oriented downward. To observe the change in the ink density on paper, these ball-point pens were each subjected to a handwriting test before and after they were allowed to stand within the thermostatic chamber.

Further, still another sample group of the ball-point pens was subjected to a writing test in which straight lines were drawn on a JIS P3001 paper sheet A with each of the ball-point pens by means of the spiral-type writing tester in a nonrotation mode under two different kinds of writing conditions: writing angle=65, load=100 g and writing speed=7 cm/sec (first conditions); and writing angle=65, load=100 g and writing speed=1 cm/sec (second conditions). The line widths of straight lines drawn under the first and second conditions were measured for evaluating the degree of feathering on the basis of the ratio of line width obtained under the first conditions to that obtained under the second conditions. It is noted that the viscosity of each ink composition was measured by means of a BL viscometer (of Brookfield type) produced by TOKYO KEIKI CO. The viscosities of the ink compositions of Examples 1 to 6 and Comparative Examples 1 to 6 were measured with a No. 1 rotor at 60 rpm, while those of Examples 7 to 12 and Comparative Examples 7 to 12 were measured with a No. 3 rotor at 6 rpm.

The test results are shown in Tables 1 and 2.

TABLE 1

| Ink | Writing touch | Ball sinkage (μm) | Change in ink density on paper* | Feathering | Viscosity (CPS) |
|---|---|---|---|---|---|
| Ex. 1 | Smooth | 6.4 | No change | 1.5 | 6 |
| Ex. 2 | Smooth | 5.3 | No change | 2.0 | 5 |
| Ex. 3 | Smooth | 3.7 | No change | 1.8 | 4 |
| Ex. 4 | Smooth | 4.3 | No change | 1.8 | 5 |
| Ex. 5 | Smooth | 8.2 | No change | 1.4 | 5 |
| Ex. 6 | Smooth | 4.5 | No change | 1.8 | 5 |
| Ex. 7 | Smooth | 4.8 | No change | 1.6 | 6200 |
| Ex. 8 | Smooth | 3.0 | No change | 1.8 | 8000 |

TABLE 1-continued

| Ink | Writing touch | Ball sinkage (μm) | Change in ink density on paper* | Feathering | Viscosity (CPS) |
|---|---|---|---|---|---|
| Ex. 9 | Smooth | 4.6 | No change | 1.6 | 3500 |
| Ex. 10 | Smooth | 3.6 | No change | 1.7 | 4000 |
| Ex. 11 | Smooth | 7.6 | No change | 1.5 | 4200 |
| Ex. 12 | smooth | 4.8 | No change | 1.7 | 3900 |

*Observed after ball-point pens were allowed to stand at 50° C. for one month.

TABLE 2

| Ink | Writing touch | Ball sinkage (μm) | Change in ink density on paper* | Feathering | Viscosity (CPS) |
|---|---|---|---|---|---|
| Comp. Ex. 1 | Line with breaks | 25.9 | Increased | 2.5 | 5 |
| Comp. Ex. 2 | Line with breaks | 32.7 | Increased | 3.0 | 5 |
| Comp. Ex. 3 | Line with breaks | 15.2 | Increased | 2.4 | 4 |
| Comp. Ex. 4 | Line with breaks | 18.4 | Increased | 2.5 | 5 |
| Comp. Ex. 5 | Line with breaks | 24.8 | Increased | 2.0 | 5 |
| Comp. Ex. 6 | Line with breaks | 26.3 | Increased | 2.5 | 5 |
| Comp. Ex. 7 | Line with breaks | 32.5 | Increased | 2.3 | 5900 |
| Comp. Ex. 8 | Line with breaks | 37.0 | Increased | 2.7 | 7600 |
| Comp. Ex. 9 | Line with breaks | 17.1 | Increased | 2.6 | 3200 |
| Comp. Ex. 10 | Line with breaks | 14.9 | Increased | 2.6 | 3900 |
| Comp. Ex. 11 | Line with breaks | 30.2 | Increased | 2.1 | 3800 |
| Comp. Ex. 12 | Line with breaks | 29.5 | Increased | 2.6 | 3400 |

*Observed after ball-point pens were allowed to stand at 50° C. for one month.

It should be noted that, although the compounds of formula (1) specified by specific formulae (1) to (5) used in Examples 1 to 12 all have $CH_3$ as Y, those having $C_2H_5-$, $C_3H_7-$ or $C_4H_9-$ as Y may exhibit substantially the same effects as in Examples 1 to 12.

As has been described, the aqueous ink composition for ball-point pen of the present invention is excellent in lubricity, wear resistance of ball seat, writing touch and long-term stability, and is less liable to feather on paper. Hence, the ink composition of the present invention is more advantageous to practical use than conventional aqueous ink compositions.

What is claimed is:

1. An aqueous ink composition for ball-point pen comprising an aqueous ink mixture containing at least a coloring agent, a dispersant, a water-soluble organic solvent and water, and a compound of the general formula (1):

wherein R1 and R2 represent OH and/or $HO(CH_2CH_2O)n$ and/or

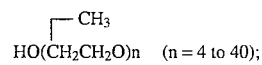

(n = 4 to 40);

$$R3 \text{ represents } CH \begin{cases} CH(OH)(CH_2)_7COOY \\ (CH_2)_6CH_3 \end{cases}$$

where Y is CmH2m+1 (m is an integer of not larger than 4); and X represents an alkali metal salt, amine salt or alkanolamine salt.

2. An aqueous ink composition as defined in claim 1, wherein said compound of the general formula (1) includes one or more compounds selected from the group consisting of compounds of R1, R2, R3 and X of which are specified by the specific formulae (1) to (5):

Specific formula (1):

$$R1, R2 = (CH_2CH_2OH)_{23}OH$$

$$R3 = CH \begin{cases} CH(OH)(CH_2)_7COOCH_3 \\ (CH_2)_6CH_3 \end{cases}$$

$$X = N(CH_2CH_2OH)_3$$

Specific formula (2):

$$R1, R2 = (CHCH_2O)_{17}OH \begin{cases} CH_3 \end{cases}$$

$$R3 = CH \begin{cases} CH(OH)(CH_2)_7COOCH_3 \\ (CH_2)_6CH_3 \end{cases}$$

$$X = Na$$

Specific formula (3):

$$R1, R2 = OH$$

$$R3 = CH \begin{cases} CH(OH)(CH_2)_7COOCH_3 \\ (CH_2)_6CH_3 \end{cases}$$

$$X = N(CH_2CH_2OH)_3$$

Specific formula (4):

$$R1, R2 = (CH_2CH_2OH)_{23}OH$$

$$R3 = CH \begin{cases} CH(OH)(CH_2)_7COOCH_3 \\ (CH_2)_6CH_3 \end{cases}$$

$$X = K$$

Specific formula (5):

$$R1, R2 = (CH_2CH_2OH)_{23}OH$$

$$R3 = CH \begin{cases} CH(OH)(CH_2)_7COOCH_3 \\ (CH_2)_6CH_3 \end{cases}$$

$$X = C_2H_5NH_2.$$

3. An aqueous ink composition as defined in claim 1, wherein said compound of the general formula (1) is contained in an amount of 0.05% by weight to 10% by weight relative to the total amount of the ink composition.

4. An aqueous ink composition as defined in claim 1, wherein said coloring agent is a pigment.

5. An aqueous ink composition as defined in claim 1, wherein said coloring agent is a colored resin emulsion.

6. An aqueous ink composition as defined in claim 1, further comprising an antiseptic agent.

7. An aqueous ink composition as defined in claim 6, wherein said antiseptic agent is 1,2-benzisothiazoline-3-on.

8. An aqueous ink composition as defined in claim 1, which has a viscosity ranging from 500 cps to 10000 cps.

* * * * *